APPARATUS FOR COMMUNICATION TRUNK CIRCUITS

Filed Dec. 23, 1964 2 Sheets-Sheet 1

INVENTOR
C. E. GERMANTON
BY
ATTORNEY

July 2, 1968 C. E. GERMANTON 3,391,252

APPARATUS FOR COMMUNICATION TRUNK CIRCUITS

Filed Dec. 23, 1964 2 Sheets-Sheet 2

United States Patent Office 3,391,252

Patented July 2, 1968

3,391,252
APPARATUS FOR COMMUNICATION TRUNK CIRCUITS

Charles E. Germanton, Summit, N.J., assignor to Bell Telephone Laboratories, Incorporated, New York, N.Y., a corporation of New York Filed Dec. 23, 1964, Ser. No. 420,636
12 Claims. (Cl. 179—18)

ABSTRACT OF THE DISCLOSURE

The electrical charge remaining on the conductors of a trunk after call termination is neutralized by connecting a charged capacitor thereto.

Figure 1:
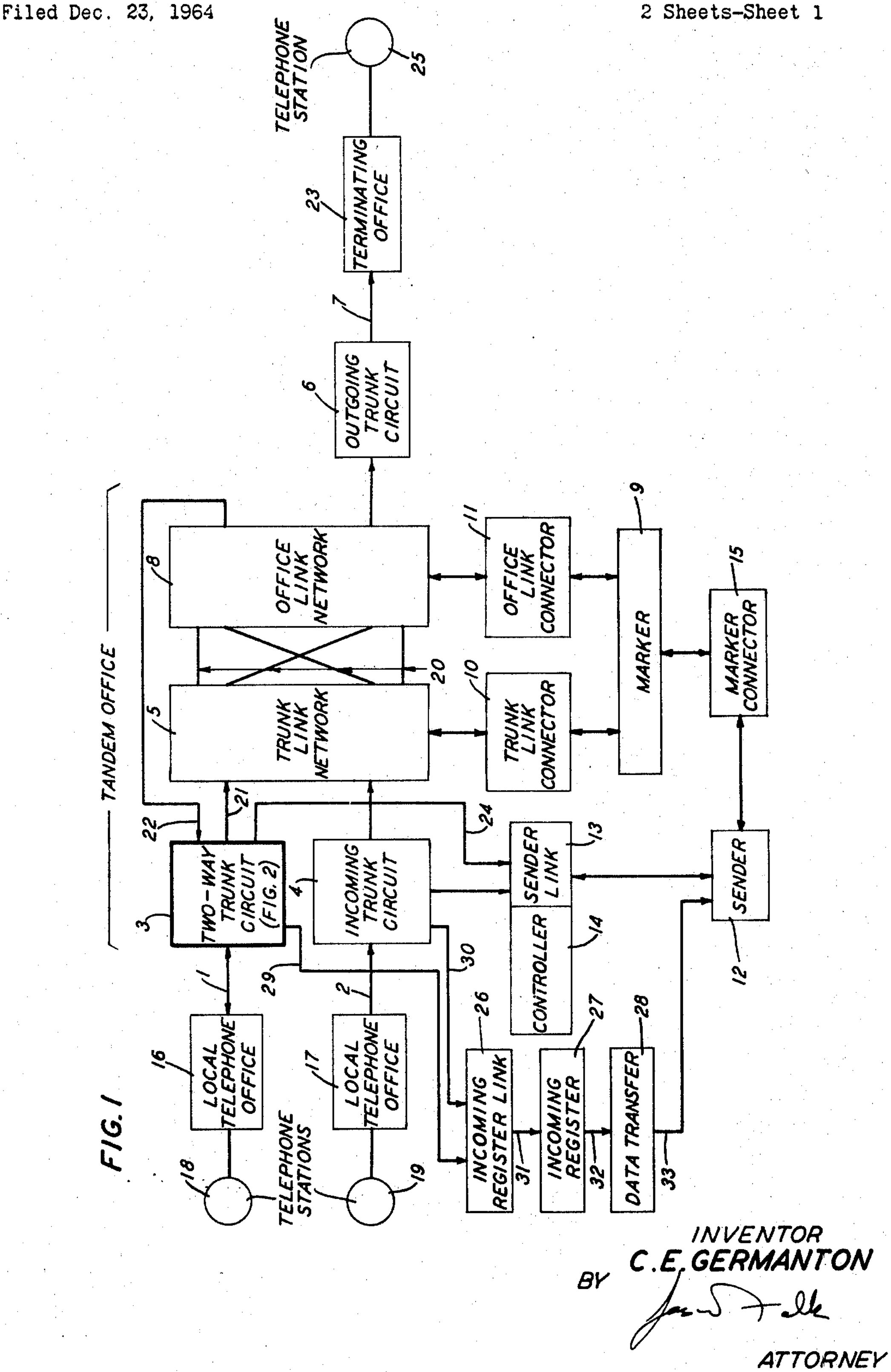

This invention relates to trunk switching apparatus and particularly to so-called seizure control and neutralizing apparatus for communication trunk circuits. My invention further relates to speed-of-seizure control facilities utilized in two-way trunk circuits of a telephone system for minimizing communication interference due to both premature and simultaneous seizures of a two-way trunk. The present invention more particularly relates to neutralizing circuitry which reduces both service irregularities, such as wrong number calls, and the amount of time that a trunking facility is held out-of-service by neutralizing the capacitive charge which temporarily remains between trunk conductors after a telephone call has been completed.

In order to utilize trunking facilities efficiently and economically, a trunk is often used for serving calls one at a time in each direction between two telephone offices. Each terminus of such a two-way trunk customarily terminates at one of the offices in a two-way trunk circuit which establishes and supervises call connections between the trunk and the switching network of that office.

A deficiency in such trunking arrangements of the prior art has been that no adequate facilities have been available for preventing certain abnormal service conditions which occur when the trunk circuits in each of the offices receive separate calls and then simultaneously seize the same two-way trunk in an endeavor to complete their respective calls. The abnormal conditions that generally result include the blockage of each call, the time-out of switching equipment engaged on the calls and the routing of the calls to advisory information sources, as well as the necessity of initiating the calls anew after receiving the information.

In addition, such trunks are occasionally seized prematurely after the termination of a call and before both of the associated trunk circuits have sufficiently recycled in preparation for serving a new call. Premature seizures may result in the mutilation of outpulsed call data in certain systems, such as step-by-step, and consequently the completion of calls to wrong numbers.

A further deficiency of such arrangements is that no facilities are furnished for neutralizing an electrical charge which remains on the capacitance of the trunk conductors for a prolonged period after a call has been terminated. This capacitance discharges following a call termination and usually causes undesired operations of control apparatus in an associated trunk circuit. These operations, in turn, often produce so-called false start signals which would result in the unproductive tie-up of other system switching equipment. However, it has been a common practice in the prior art to block such false starts by withholding the associated trunk facilities from serving a new telephone call until after the capacitance has discharged and the control apparatus has been released. While this practice has been technically reliable for preventing the false starts problems, it has impaired the efficient and economical use of the trunk facilities.

In view of the foregoing, an object of my invention is to improve seizure control apparatus for trunk facilities.

Another object is to reduce communication interference due to simultaneous seizures of two-way trunks.

It is another object of the present invention to reduce the time delays encountered in making a trunk facility available for serving a new call after a prior call has been terminated and particularly to eliminate undesired operations in trunk circuits which are caused by electrical charges stored on the capacitance of trunk conductors after a call has been terminated.

These and other objects of my invention are attained in a specific exemplary embodiment thereof comprising switching apparatus which is employed in a two-way trunk circuit at a tandem telephone office for selectively connecting a charged capacitor or a call supervisory relay into various circuit configurations across a two-way trunk while serving incoming and outgoing calls. Initially, the switching apparatus connects the capacitor in series with a resistance across the trunk to provide a conventional idle circuit termination which prevents an associated repeater amplifier from oscillating while the trunk circuit is idle. The capacitor is also initially charged during this idle period.

In order to prevent the simultaneous seizure of the two-way trunk by both the tandem office and an associated local telephone office, my invention enables the trunk circuit at the tandem office to seize the trunk with greater speed for a tandem outgoing call than an associated trunk circuit at the local office can seize it for an incoming call to the tandem office. According to my invention, the switching apparatus of the tandem trunk circuit is activated upon the receipt of a tandem outgoing call for connecting the charged capacitor to the two-way trunk so that twice the conventional seizure voltage is applied to that trunk for a brief period in order to operate a seizure relay in the local office trunk circuit faster than in prior art arrangements. The latter trunk circuit is equipped to supply only the conventional seizure voltage to the two-way trunk upon the receipt of a call to the tandem office.

As a consequence, the tandem office is afforded priority use of the two-way trunk so that it may extend tandem outgoing calls to their local office destinations faster than simultaneous incoming calls to the tandem point. This is an advantage of the present invention because the tandem outgoing calls are more proximate to their completion than the concurrent incoming tandem calls and, moreover, they are utilizing more switching equipment in the tandem and a local office than the incoming calls bidding for the use of the same two-way trunks.

The conductors of the two-way trunk include a predetermined value of capacitance and this capacitance is charged by virtue of the voltages supplied to the trunk for supervisory purposes during a call. In accordance with my invention, the two-way trunk circuit at the tandem office is equipped with a call supervisory relay which is selectively connected to the associated two-way trunk for detecting when the trunk conductor capacitance has been discharged and the supervisory potentials have been disconnected from the trunk by the local office trunk circuit after that circuit has been switched into its idle state at the end of an outgoing call. This relay thus enables the tandem office trunk circuit to recycle immediately so that it is ready to accept an incoming call after the local office seizes the two-way trunk. Such a precaution prevents premature outpulsing from the local office and mutilation of call data which heretofore has resulted in service irregularities such as call completions to wrong numbers.

The charge on the trunk conductor capacitance is neutralized at the end of an incoming call to the tandem office by selectively connecting the charged capacitor (priorly used for an idle circuit termination) to the two-way trunk in opposition to the charged trunk capacitance. The two charges thus cancel each other and thereby prevent the undesired operations which have heretofore occurred in prior art trunk circuits following the termination of a call. As a result, in accordance with my invention, the objectionable false starts are not generated by trunk circuits and, accordingly, those circuits are not held out-of-productive service for blocking such starts after a call has been completed. Moreover, this neutralizing feature enables the trunk circuit to distinguish between a valid reseizure by the local office and momentary invalid operations of the trunk circuit due to charged trunk capacitance.

A feature of my invention is the provision of a seizure control circuit comprising apparatus for charging a capacitance and then selectively connecting it across one terminus of a communication line in order to operate speedily a control apparatus at the other terminus of that line.

Another feature is the provision of a two-conductor communication line, a first source of potential connected to a terminus of one of the line conductors, an electrical apparatus having a two-terminal energizing device, one terminal thereof being connected to a second source of potential and the other terminal connected to a terminus of the other one of the line conductors, a capacitance, and circuitry for electrically charging the capacitance and connecting it to another terminus of each of the line conductors in a cooperating relationship with the first and second sources of potential to increase the speed of energizing the electrical apparatus.

Another feature is the provision of a two-way trunk having a pair of conductors; a pair of two-way trunk circuits, each being individually connected to one end of the trunk and comprising a relay having a pair of two-terminal windings, one terminal of each of the windings being individually connected to a different source of potential, the other terminal of each of the windings being individually connected to one end of one of the trunk conductors, and circuitry selectively connectable to the last-mentioned ends of the trunk conductors for operating the relay connected to the other ends of the trunk conductors; and apparatus in the circuitry of one of the trunk circuits including a capacitor and means for electrically charging and connecting that capacitor to the associated ends of the trunk conductors for cooperating with the potential sources to reduce the operate time of the relay at the other ends of the trunk conductors.

It is an another feature of this invention that a trunk circuit comprise an electrical impedance network including a capacitor and a resistance, means for connecting the network to a communication trunk to provide an idle circuit termination, means for charging the capacitor, apparatus responsive to a control signal for selectively connecting the charged capacitor to the trunk conductors as part of a voltage doubler arrangement, and means responsive to another control signal for selectively connecting the charged capacitor to the trunk conductors to neutralize an electrical capacitance charge on the trunk conductors.

Another feature is the provision of communication trunking circuitry comprising a pair of conductors connectable to a communication trunk, an impedance termination network including a capacitor and a resistance, means for selectively connecting the network to the pair of conductors, a source for supplying electrical potentials to the trunk, means for charging the capacitor to the supplied electrical potentials of the source, and switching apparatus responsive to the receipt of a control signal for selectively connecting the pair of conductors and the charged capacitor in series with the source whereby twice the supply potential are applied to the conductors.

Another feature, directly related to the immediately preceding one, is that the communication trunk conductors have an electrical capacitance and that the trunking circuitry further comprises means for charging the trunk conductor capacitance to the supply potentials of the source, and apparatus responsive to another control signal for selectively connecting the charged network capacitor to the trunk in opposition to the electrical charge of the conductor capacitance and thereby neutralizing the last-mentioned charge.

It is another feature of my invention that a two-way trunk circuit comprises a first communication path to a two-way trunk used for serving incoming and outgoing telephone calls, a second communication path to a telephone switching network for serving the incoming calls, and a polarized relay which is selectively connected to the second path for supervising incoming call connections through the switching network, as well as to the first path for both controlling the establishment of outgoing call connections over the trunk and detecting when the distant office trunk circuit has restored to its idle state after the termination of the outgoing call.

Figure 2:
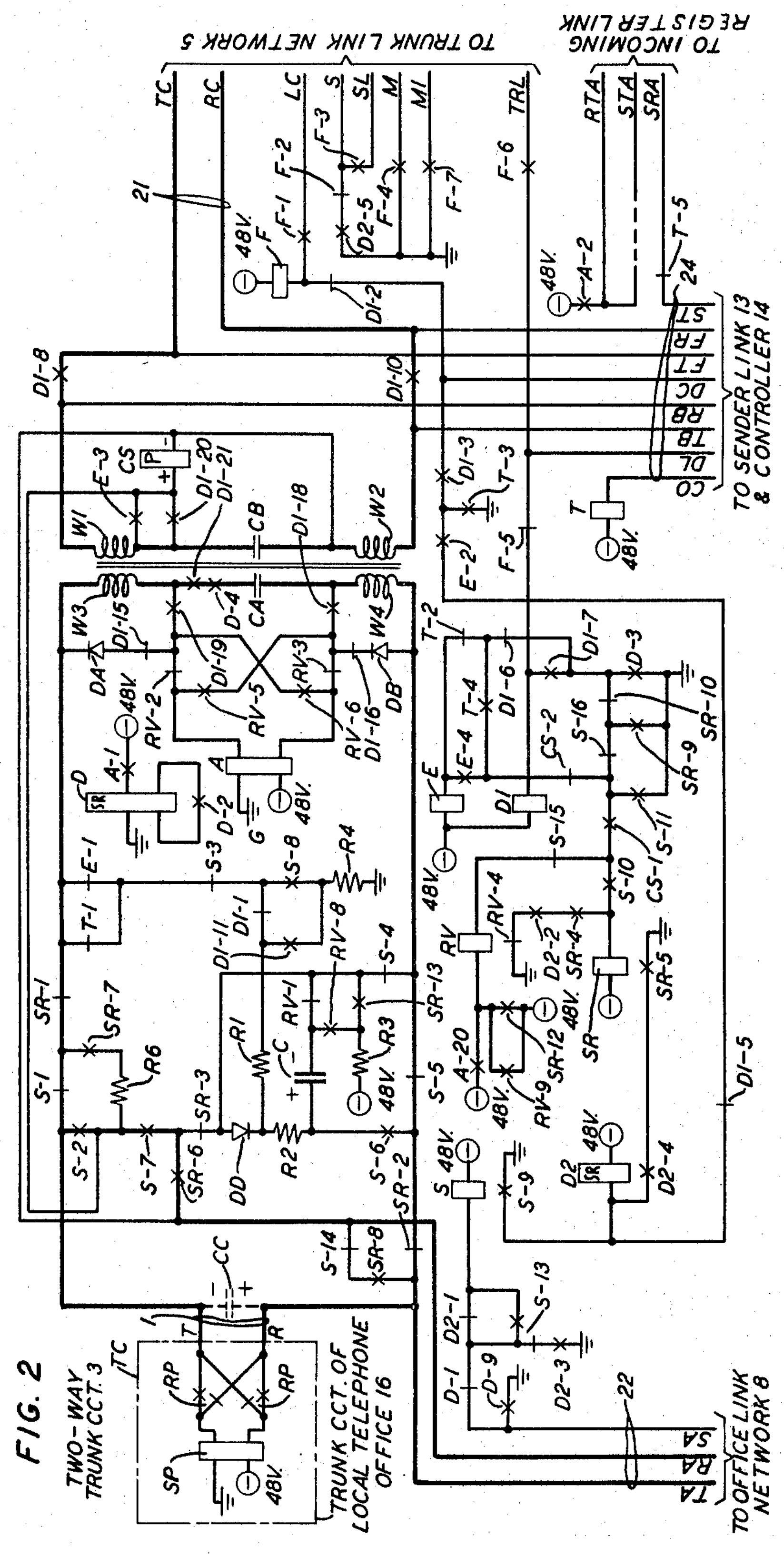

The foregoing objects, advantages and features of this invention may be more clearly understood by a reading of the following description of an exemplary embodiment thereof shown in the drawing in which:

FIG. 1 shows. in block diagram form, an exemplary two-way trunk circuit employed in an existing crossbar tandem telephone office; and FIG. 2 is a schematic drawing of the two-way trunk circuit having features illustrative of my invention.

It will be noted that FIG. 2 employs a type of notation referred to as "detached-contact" in which an X crossing a line represents a normally open contact of a relay and a bar crossing a line represents a normally closed contact of a relay; "normally" referring to the non-operated, or released, state of the relay. The other relay components including its winding are represented by a rectangular symbol. The principles of this type of notation are described in an article entitled "An Improved Detached-Contact-Type of Schematic Circuit Drawing" by F. T. Meyer in the September 1955 publication of the American Institute of Electrical Engineers Transactions, Communications and Electronics No. 20, volume 74, pages 505–513.

Each relay contact is designated in the drawing in a manner which indicates the relay of which it is a part and, as well uniquely identifies it will respect to the other contacts of the same relay. For example, referring to S–1 shown in the upper left side of FIG. 2, it is noted that the S portion of the designation indicates that it is controlled by the S relay of FIG. 2 and the "–1" uniquely identifies it with respect to the adjacent contact S–2 of relay S.

The equipment illustrative of the principles of my invention has been designed for incorporation, by way of example, into a crossbar tandem telephone system of the type disclosed in the L. J. Cerny, O. Cesarreo, R. B. Curtis, J. G. Nightingale, F. H. Parkinson, Jr. patent application Ser. No. 325,842, filed Nov. 26, 1963, now U.S. Patent No. 3,341,662 issued Sept. 12, 1967. It is to be understood, however, that the present invention is not limited to use with a telephone system of this type because it may be utilized with other types of switching systems. Inasmuch as my invention is particularly concerned with the apparatus of the illustrative two-way trunk circuit 1, the other equipment units of the Cerny et al. system are depicted in the drawing in block diagram form. The latter units are neither shown nor described in detail herein except where necessary for a complete understanding of my invention. Reference may be made to the latter patent application and the patents and other disclosures referred to therein for a complete understanding of the construction of that equipment and its operation.

It is noted that, for convenience in understanding the present invention, the circuitry employed inthe trunk circuits 3 and 4 may be identical and that only the incoming features of circuit 3 as shown in FIG. 2 are utilized in trunk circuit 4.

GENERAL DESCRIPTION

The organization of the principal equipment units of the illustrative embodiment will now be described with reference to FIG. 1. All interoffice trunk circuits from local telephone offices terminate in two-way and incoming trunk circuits which are connected to a trunk link network. All outgoing trunk circuits and interoffice trunks to terminating offices are connected to an office link network. Illustrative of these arrangements are the interoffice trunks 1 and 2 and the two-way and incoming trunk circuits 3 and 4 associated with the trunk link network 5, and the outgoing trunk circuit 6 and trunk 7 associated with the office link network 8. Interoffice trunks, such as trunks 1, 2 and 7 are selectively interconnected by means of apparatus (not shown) of the telephone switching network comprising trunk circuits, trunk and office link networks and interframe junctors 20.

Marker circuits, such as marker 9, control the apparatus units (not shown) of the trunk and office link networks 5 and 8 through trunk and office link connectors 10 and 11 to establish connections between the trunk circuits.

Interoffice trunks, such as trunks 1 and 2, have access to senders, such as sender 12, through the two-way and incoming trunk circuits as well as sender links, such as link 13. The trunk to sender connections are established with the aid of controller circuits, such as controller 14, associated with the sender links. A sender circuit is used on each call to receive and register information regarding the location of trunk circuits in the trunk link network, the called office code and the called customer line number. It receives this information via a data transfer circuit 28 from an incoming register, such as register 27, which priorly receives it via an incoming register link 26 from a calling trunk. The sender is also arranged to convey all of the received information except the called customer line number to a marker 9 through a marker connector 15 to enable the marker to perform the necessary translation and control functions required to establish a communication channel, or connections, between the incoming and outgoing interoffice trunks and, as well, to prescribe for the sender the character of outpulse signaling to be used for controlling equipment at a call terminating telephone office.

As is fully described in the Cerny et al. disclosure, when one of the interoffice trunks 1 or 2 is seized by the associated local telephone office 16 or 17 for extending a telephone call from the telephone station 18 or 19, the related trunk circuit 3 or 4 recognizes the seizure and activates the incoming register link 26 to connect the seized trunk to the incoming register 27. The register 27 then informs the trunk circuit 3 or 4 that it is ready to receive the dialed digits over cable 29 or 30. The register 27 then proceeds to receive and register all of the dialed digits.

When the register 27 has registered the last dialed digit, it cooperates with the calling one of the trunk circuits 3 or 4 to activate the sender link 13 to connect an idle sender 12 to trunk circuit 3 or 4. At approximately the same time, a signal is sent via the register 27 to operate the data transfer circuit 28 which, in turn, interconnects register 27 and sender 12 for transferring the registered call data to sender 12.

Immediately following the transfer of all registered digits, the sender 12 is connected to the marker 9 through the marker connector 15 and it transfers to the marker 9 the called office code and the trunk link network location of the calling trunk circuit 3 or 4.

The marker 9 is equipped with an office code translator which translates the received called office code and supplies the control information required to complete connections to the called station. This information enables the marker 9 to seize the office link network 8 through the office link connector 11 and select an associated trunk circuit to the called telephone office. With knowledge of the network location of the calling trunk circuits 3 or 4, the marker 9 then seizes the trunk link network through the trunk link connector 10 and proceeds to test for an available communication channel for interconnecting the calling and called trunk circuits. After finding an available channel, it effects the operation of switches (not shown) in the trunk and office link networks 5 and 8 to close through that channel. This channel is extended further through the calling one of the trunk circuits 3 or 4 and the sender link 13 to the sender 12 and provides a path for subsequently outpulsing information from the sender 12 to control the equipment (not shown) at the called telephone office which establishes connections to the called telephone station. After this channel has been established, marker 9 passes to the sender 12 via the connector 15 the information concerning the character of outpulsing to be sent over the established connections.

When the marker 9 has completed the foregoing circuit operations and others, which are not described herein because they are not necessary for an understanding of my invention, the marker 9 and connectors 10, 11 and 15 are released.

After the sender 12 has received the last digit of the called customer number from the originating telephone office, it immediately operates in accordance with the information received from the marker 9 to outpulse digit information to the called telephone office for operating equipment (not shown) thereat which establishes connections to the called customer line. The sender 12 outpulses to the called office via switching gear (not shown) of the sender link 13, the calling one of the trunk circuits 3 or 4, trunk link network 5, wire junctors 20, office link network 8, and a trunk circuit and trunk to the called office.

Following the transmission of control signals to the called office, the sender 12 signals the calling one of the trunk circuits 3 or 4 to establish connections between the associated interoffice trunk 1 or 2 and the communication channel extending through the networks 5 and 8 toward the called office. The sender 12 then allows the calling one of the trunk circuits 3 or 4 to assume supervision over the call connections until the conclusion of the call. Sender 12 and link 13 are then released.

It is noted that the two-way trunk circuit 3 has the sets of conductors 21 and 22, each of which individually terminate in the networks 5 and 8. The conductors 21 are used in conjunction with a call communication channel through the networks 5 and 8 for serving incoming calls from the office 16 to a called office, such as the terminating office 23. The other set of conductors 22 is used for serving outgoing calls from a calling office, such as office 17, to the called office 16.

DETAILED DESCRIPTION

*Trunk circuit 3 in idle state*

Referring now to FIG. 2, a detailed description is presented of the structure and operations of the inventive features of my invention as specifically embodied, by way of example, in the two-way trunk circuit 3. It is noted that the trunk circuit 3 forms a transmission and switching circuit which provides a communication path (heavy lined) from the interoffice trunk 1 to the set of conductors 21 associated with the trunk link network 5. It also provides a communication path (heavy lined) between the trunk 1 and the set of conductors 22 associated with the office link network 8. The trunk circuit 3 is further connected to the sender link 13 and controller 14 over the cable conductors 24.

According to my invention, trunk circuit 3 is equipped with switching apparatus for selectively charging and connecting the capacitor C (shown in heavy lines in FIG. 2) into various circuit configurations across the interoffice trunk 1 during incoming and outgoing calls. Initially, when the trunk circuit 3 is idle, the capacitor C is connected in series with the resistors R1 and R2 across the T and R conductors of trunk 1 for providing an idle circuit termination for an associated repeater amplifier (not shown) which may be serially connected with trunk 1 between tandem office and office 16. Such a termination is often used in such a trunk circuit for preventing the oscillation, or singing, of the repeater amplifier. This termination is connected to the T conductor of trunk 1 through the contacts S–1, SR–1, E–1 and T–1 in parallel, S–3 and D1–1. It is also connected to the conductor R of trunk 1 through the contacts SR–2, S–5, S–4 and RV–1. At the same time, capacitor C is charged by 48 volts over the path from a ground potential G through the upper winding of relay A, contacts RV–2 and D1–15, diode DA, contacts T–1 and E–1 in parallel, S–3 and D1–1, resistors R1 and R2, capacitor C, contacts RV–1 and S–4, diode DB, contacts D1–16 and RV–3, and the lower winding of relay A to the negative 48 volts.

*Incoming call to tandem office*

Before proceeding, it is advantageous to note that the operations of trunk circuits 3 and 4 may be the same for serving incoming calls when the same apparatus (FIG. 2) is used in each such circuit.

When the local telephone office 16 is presented with an outgoing call which is to be completed via the tandem office, it selects an idle trunk circuit, for example, circuit TC and causes it to apply a loop closure signal (not shown) between the T and R conductors in the well-known manner for completing the path for operating relay A of trunk circuit 3. This path is from ground through the upper winding of relay A, contacts RV–2 and D1–15, diode DA, contacts RS–1 and S–1 to conductor T of trunk 1, the loop closure in trunk circuit TC, conductor R of trunk 1, contacts SR–2 and S–5, diode DB, contacts D1–16 and RV–3 and the lower winding of relay A to the negative 48 volts. In operating, relay A actuates its contact A–1 for completing the obvious circuit for operating relay D. The operation of relay D closes its contact D–2 to short-circuit its lower winding and thereby make it slow releasing. The operated relay D also activates relay E over the path including contacts T–2, D1–6 and D–3 to ground. In addition, relay D grounds lead SA via contact D–9 in order to make the trunk circuit 3 appear busy for outgoing calls.

When relay A operates, it requests the incoming register link 26 (FIG. 1) to connect a register 27 to trunk circuit 3. This request is made when relay A actuates contact A–2 and applies ground to lead STA. After the register 27 has been connected ot circuit 3, the dialed digits are "dial pulse" transmitted over trunk 1. Relay A is operated and released in response to the received pulses in the conventional manner and, in doing so, it conveys them to the register 27 via link 26 by applying negative 48 volts in FIG. 2 via contact A–2 and lead RTA. After the register 27 has received all of the dialed digits, it causes a signal to be applied via lead SRA, contact T–5 and lead ST to the sender link 13. This signal requests the establishment of connections between the sender 12 and trunk circuit 3 via link 13 and between the register 27 and sender 12 via the data transfer circuit 28. All of the call data is then transferred from the register 27 to the sender 12. The sender 12 via link 13 applies a ground to lead CO for operating relay T over the obvious path. In operating, relay T disconnects the ground request from lead ST at contacts T–5. It also operates relay D2 over the path through contacts D1–5, E–2 and T–3 to ground. Operated relay T completes parallel locking paths for relay E via the contacts E–4, T–4, D1–6 and D–3 to ground and the contacts E–4, CS–2, S–16, SR–10 and D–3 to ground. The operation of relay T also disconnects the idle circuit termination resistors R1 and R2 and capacitor C from the trunk 1 at contacts T–1.

Shortly afterwards, the sender 12 applies ground and negative 48 volts (not shown) to the TB leads of cable 24 via contact E–3, the CS relay winding and the repeat coil windings W1 and W2 to monitor for abandonment of the call. This polarity on leads TB and RB is such that relay CS does not operate. Upon such an abandonment, the relays A, D and E would be released and, in turn, contact E–3 would release the sender 12.

As disclosed in the Cerny et al. application, when the sender 12 has registered the called office code, it is connected to a marker 9 via a marker connector 15 for transferring the registered code and information pertaining to the trunk link network location of trunk circuit 3. Marker 9 then translates the received office code and seizes the office link network 8 (FIG. 1) via the connector 11 while, at the same time, selecting an idle outgoing trunk circuit 6 and trunk 7 to a terminating office 23 serving a called station 25. Subsequently, marker 9 seizes the trunk link network 5 via connector 10 and proceeds to test for and to establish a communication channel for interconnecting trunk circuits 3 and 6.

Marker 9 establishes the channel, in part, by causing the sender 12 to operate relay F of FIG. 2 via link 13, lead DC of cable 24 and contact D1–2. In operating, relay F controls the operation of crossbar switches (not shown) in the trunk link network 5 over lead LC and contact F–1 as described in Cerny et al. Relay F also grounds the M and M1 leads via its contacts F–4 and F–7 and connects the S and SL leads via its contact F–3 and leads TRL and DL via its contact F–6 for the conventional circuit tests and operations of the trunk link network 5 as disclosed in Cerny et al. Marker 9 next passes to sender 12, via the connector 15, the information regarding the character of outpulsing to be sent over the established channel through networks 5 and 8 to the office 23.

When the marker 9 has completed the establishment and checking of the channel between trunk circuits 3 and 6, it causes the release of relay F via the sender 12 and link 13. Upon the release of relay F, contact F–2 is closed to apply ground via contact D2–5 to sleeve leads toward network 5 for holding the established connections.

Sender 12 is next connected to the FT and FR leads of cable 24 via the link 13 and it outpulses the digit information needed by the office 23 for completing the connections to a called station 25. The outpulsing is over the path including leads FT and FR, conductors TC and RC of cable 21 and the established channel through networks 5 and 8, trunk circuit 6 and trunk 7 to office 23. The sender 12 then grounds the DL lead for operating relay D1 over the path through contact F–5. In operating, relay D1 locks via contacts D1–7 and D–3 to ground. Operated relay D1 also released the incoming register link 26 and register 27 by opening lead STA.

The operation of relay D1 also closes an auxiliary operate path for the already operated relay D2 via contact D1–9. Relay D1 further completes the transmission path from trunk 1 to the channel through networks 5 and 8 toward the called station. This path is from lead T of trunk 1 via contacts S–1 and SR–1, winding W3, contacts D1–D21 and D–4, capacitor CA, winding W4 and contacts S–5 and SR–2 to lead R of trunk 1. The path further includes windings W1 and W2, capacitor CB and contacts D1–8 and D1–10 to leads TC and RC.

Operated relay D1 also grounds lead DC to the sender 12 via contacts T–3 and D1–3 and link 13. Sender 12 checks for this DC lead ground as disclosed in Cerny et al. and then removes the ground from lead CO for releasing relay T. In releasing, relay T opens contact T–3 for removing ground from lead DC. Sender 12 also checks for this ground removal and then releases the link 13 and itself from the call.

Meanwhile, the office 23 establishes call connections to the called telephone station and then activates the ringer of that telephone. When the called party answers, the polarities of the potentials (not shown) applied to the leads TC and RC via the trunk circuit 6 are reversed in the customary manner. This reversal operates relay CS which then releases relay E by opening contact CS–2. The operation of relay CS also operates relay RV over the path from negative 48 volts through contacts A–20, the RV relay winding and contacts S–15, CS–1, S–16, SR–10 and D–3 to ground. In operating, relay RV locks via contact RV–9 and sends the usual potential reversal signal over the trunk 1 toward the office 16. This reversal signal is sent by applying ground to lead R of trunk 1 over the path through contacts SR–2 and S–5, winding W4, contacts D1–18 and RV–5, and the A relay winding to ground; and, at the same time, negative 48 volts to lead T of trunk 1 over the path through contacts S–1 and SR–1, winding W3, contacts D1–19 and RV–6 and the A relay winding. The calling and called parties are then generally proceeding with their conversation.

While the call is in progress, the T and R lead capacitance CC (indicated by dotted lines in FIG. 2) of trunk 1 is charged to the polarities depicted in FIG. 2 as a consequence of the negative and ground potentials applied to leads T and R over the last described paths. The circuitry employed in prior art arrangements customarily required several hundred milliseconds to discharge this trunk lead capacitance after each call had been completed. Heretofore, the discharge path has been through the A relay windings and the discharge current produced in the prior art arrangements has been sufficient to reoperate and hold that relay operated for a substantial portion of the discharge period. As a consequence, the trunk circuits, such as circuits TC and 3, heretofore have been held out-of-service during this prolonged operated time of relay A in order to prevent false starts for senders, sender links and controllers.

According to my invention, the aforementioned charge on the trunk lead capacitance CC is neutralized by charging the capacitor C after relay RV has operated, as previously described, and thereafter connecting that charged capacitor C across the leads T and R in opposition to the charged lead capacitance CC. The result is that relay A does not operate or remain operated due to discharge currents after a call has been completed and, accordingly, the trunk circuit 3 is more quickly made available for serving another call than similar trunk circuits of the prior art. This feature allows a valid seizure from office 16 to be detected quickly enough by trunk circuit 3 so that the first pulse is registered by register 27 instead of being mutilated as in prior art arrangements.

When relay RV operated following the receipt of the called party answer signal, the capacitor C recharged over the path from the negative 48 volts through resistor R3, contact RV–8, capacitor C, resistors R2 and R1, contact D1–D11 and resistor R4 to ground. The capacitor C remains so charged awaiting the termination of the call.

If the calling party "hangs-up" first at the end of the call, the trunk supervisory relay A is released and it, in turn, effects the release of relay D by opening contact A–1. The release of relay D opens its contact D–3 for de-energizing relays D1 and RV and its contact D–4 for disconnecting capacitor CA from the transmission path between trunk 1 and network 5. Release relay D1 also opens contacts D1–8, D1–21 and D1–10 to open the transmission path to network 5 and to release relay CS. The terminating office 23 then releases from the call.

Upon releasing, relay RV sends an "on-hook" signal toward the office 16 by reversing, at its transfer contacts RV–2, RV–5 and RV–3 and RV–6, the ground and negative 48 volts supplied via the A relay windings to the trunk 1. In prior art tandem trunk circuits, when this reversal occurred, the A relay would operate under control of the series aiding charge stored on the trunk lead capacitance CC. Relay A would remain so operated for several hundred milliseconds and hence it would be necessary in such arrangements to hold the two-way trunk circuit from service during that operated interval; otherwise, false incoming register starts would occur.

In accordance with the present invention, when relay RV releases, it sends the reversal signal to office 16, as described, and simultaneously reconnects the charged capacitor C across the T and R leads for neutralizing, or canceling, the charged capacitance CC of these leads. Capacitor C is connected to the R lead via contacts RV–1, S–4, S–5 and SR–2, as well as to the T lead via resistors R2 and R1 and contacts D1–1, S–3, E–1 and T–1 in parallel, SR–1 and S–1. The neutralization of the charged lead capacitance CC prevents the undesired operation of relay A and enables the two-way trunk circuit 3 to be ready for immediate reseizure on a subsequent incoming call by eliminating the unwarranted several hundred millisecond delay encountered with prior art two-way tandem trunk circuits. After the neutralization is effective the resistors R1 and R2 and the capacitor C provide the aforementioned idle circuit termination.

When relay D1 released, as already described, it opened contact D1–9 for releasing relay D2. The release of relay D2 opens contact D2–5 for disconnecting ground from the sleeve lead S toward the network 5 and thereby releases the switch connections to trunk circuit 6. The system is then returned to its idle state with respect to the incoming call on trunk 1.

*Outgoing call from tandem office*

Turning now to the case where the trunk circuit 3 is used for completing an outgoing call from the tandem office to the local office 16, it is assumed that such a call is originated at office 17 of FIG. 1 and is received in the tandem office in the incoming trunk circuit 4. It is further assumed that such a call is processed by the sender 12, sender link 13, marker connector 15, marker 9, and connectors 10 and 11 through the networks 5 and 8 to the two-way trunk circuit 3 via conductor set 22 in a manner as described in the Cerny at al. disclosure. When the trunk circuit 3 is seized on the outgoing call, the office link network 8 is activated by the marker 9 of FIG. 1 as set forth in Cerny et al. and that network then applies a ground potential to lead SA (lower left of FIG. 2) for operating the relay S over the path including the contacts D2–1 and D–1. In operating, relay S actuates its contact S–9 for causing the operation of relay D2 over the obvious path. The operation of relay S also connects the charged capacitor C (charged during the idle period of circuit 3) into a series-aiding circuit with the negative 48 volts supplied to the T and R conductors of trunk 1 via the windings of the supervisory, or seizure, relay SP in the trunk circuit TC of the local telephone office 16 so that relay SP is operated on 96 volts rather than the customary 48 volts in circuit TC which, as in prior art arrangements, heretofore has been generally applied to a trunk by a loop closure in the two-way trunk circuit. This apparatus of trunk circuit 3 thus enables the latter relay to operate more quickly than in prior art arrangements and minimizes problems heretofore caused by simultaneous trunk seizures. The path for applying the 96 volts is from the negative 48 volts through the lower winding of relay SP, lead R of trunk 1, contacts SR–2 and S–6, the 48 volt series aiding charge (as shown in FIG. 2) on capacitor C, contacts RV–1, SR–3, S–7 and S–2, conductor T of trunk 1, and the upper winding of relay SP to ground. After this latter path has been completed, relay SP quickly operates and capacitor C begins to discharge through the last-described path. The premature discharge of capacitor C through resistor R2 and RV–1 contact is blocked by diode DD. When relay SP has operated and capacitor C has discharged sufficiently, the diode DD is forward biased by the potentials supplied via the SP relay windings. Relay SP is then held operated over the path including the resistor R2 and diode DD paralleling the discharged capacitor C.

Subsequently, the marker 9 establishes a communication channel from the calling incoming trunk circuit 4 to the trunk circuit 3 via the networks 5 and 8, as previously explained. A tandem sender 12 of FIG. 1 is thereafter connected to the incoming trunk circuit 4 via the sender link 13 and individual cable conductors (not shown) equivalent to those of cable conductors 24 of FIG. 2. Next, the sender 12 applies a direct current loop closure, or pulsing bridge, over the FT and FR conductors (not shown) in the incoming trunk circuit 4 for completing the path for connecting the polarized relay CS in trunk circuit 3 across the T and R leads of trunk 1 and thereby causing the operation of relay CS of trunk circuit 3 under control of the ground and negative 48 volts supplied to trunk 1 via the SP relay windings. This path is from the loop closure in the sender 12 via the incoming trunk circuit 4, the T and R lead connections (not shown) through the trunk and office link networks 5 and 8, conductors 24 and thence from conductor TA of FIG. 2 to conductor R of trunk 1, as well as from conductor RA of FIG. 2 through the winding of relay CS and contact S–2 to conductor T of trunk 1. It is noted that while the last described path is established, the resistor R2 and diode DD are connected in parallel with the CS relay winding and the pulsing bridge in the sender for effectively holding operated the relays of the local office trunk circuit TC.

In operating, relay CS activates the "sender ready" relay SR over the path through contacts S–10, CS–1 and S–11 to ground. The operation of relay SR completes its locking path via contacts SR–4, D2–2 and RV–4 to ground. When operated, relay SR also actuates its contact SR–5 to complete the locking path for relay D2 via contact D2–4. The operation of relay SR also actuates its contact SR–6 to short-circuit, in conjunction with contact S–7, the CS relay windings and thereby effects the release of relay CS. The sender 12 then has purely metallic connections via sender link 13, incoming trunk circuit 4, networks 5 and 8, conductors TA and RA of FIG. 2 through trunk circuit 3 to lead R of trunk 1 and to lead T of trunk 1 via contacts SR–6, S–7, and S–2. These connections are used for outpulsing the digit information from the sender 12 to office 16 which is required for completing connections to the called station, for example station 18 of FIG. 1. The connections are also used for conveying the talking currents between the calling and called stations after the outpulsing has been completed and the called phone has been rung and answered.

The operation of relay SR also opens its contacts SR–2 and SR–3 to disconnect the capacitor from the established metallic connections and to enable capacitor C to recharge to 48 volts. This recharging path is from the negative 48 volts through resistor R3, contacts SR–13 and RV–1, capacitor C, resistors R2 and R1, contacts D1–1 and S–8, and resistor R4 to ground.

Meanwhile, the trunk circuit TC activates the contacts RP, after the called station has been rung and the called party has answered, to reverse the potentials on the T and R leads of trunk 1. The conversation between calling and called parties may be then be in progress.

If the calling party disconnects before the called party at the end of the call, the incoming trunk circuit 4 opens the tip and ring path toward the called party for initiating the release of circuits in the called office. The trunk circuit 4 then allows a guard interval as disclosed in Cerny et al. before it releases and, in turn, releases the crossbar switches (not shown) of the trunk and office link frames 5 and 8. Upon the release of these switches, ground is removed from the SA conductor of FIG. 2 for deactivating relay S. The deactivation of relay S regrounds the SA lead via contacts D–1, S–13 and D2–3 as a temporary busy signal to the tandem office equipment. It also bridges the CS relay in series with the T and R conductors of trunk 1 in such a manner that relay CS reoperates when the trunk circuit TC returns to its idle state and thereby applies negative 48 volts and ground on the R and T leads, respectively. The bridging path is from lead T via contacts S–1 and SR–7, resistor R6, CS relay winding, and contacts S–14 and SR–8 to lead R. Relay CS operates when the aforementioned voltages are supplied to the T and R conductors upon the restoration of circuit TC to its idle state; however, the SP relay does not operate under the control of the relay CS and resistor R6 bridge because of their high resistance.

Upon operating, relay CS activates the relay RV over the path from negative 48 volts through contact SR–12, the RV relay winding, contact S–15, CS–1, S–16 and SR–9 to ground. The activated relay RV, in turn, releases relay SR by opening contact RV–4. Released relay SR de-energizes relay D2 by opening contact SR–5, relay CS by opening contact SR–7 or SR–8, and relay RV by opening contact SR–9 or by release of relay CS.

In addition, the released relay SR reconnects relay A and the aforementioned idle circuit termination comprising capacitor C and resistors R1 and R2 to the trunk 1. Trunk circuit 3 then is returned to the state in which it rested prior to receipt of the call and is available for serving another incoming or outgoing call.

In view of the foregoing, it is evident that apparatus economies are realized by utilizing a single polarized relay CS for supervising the establishment and release of call connections for outgoing calls on trunk 1, as well as incoming calls on the conductors 21. Heretofore, it has been necessary to employ at least two such supervisory relays in a two-way trunk circuit. Each of these two relays would individually supervise either the incoming or outgoing terminus of the two-way trunk circuit but not both termini. According to my invention, switching apparatus is provided for selectively connecting the relay CS to the incoming and outgoing termini, namely, the trunk 1 and conductors 21 for supervising incoming and outgoing calls.

It is to be understood that the hereinbefore described arrangements are illustrative of specific applications of the principles of my invention. In light of this teaching, it is apparent that numerous other arrangements may be devised by those skilled in the art without departing from the spirit and scope of my invention. For example, the neutralization apparatus of my invention may be individually utilized in incoming trunk circuits instead of two-way trunk circuits. In like fashion, the structure for applying twice the normal seizure voltage to a trunk may be employed apart from the neutralizing circuitry in outgoing trunk circuits. Furthermore, the supervisory relay SP may be replaced by other electrical apparatus such as a bistable flip-flop or a ferrod as disclosed in J. A. Baldwin, Jr., H. F. May patent application Ser. No. 26,758, filed May 4, 1960, now U.S. Patent No. 3,175,042, issued Mar. 23, 1965.

What is claimed is:

1. A communication trunk circuit comprising an electrical impedance network including a capacitor and a resistance, means for connecting said network to a communication trunk to provide an idle circuit termination, means for charging said capacitor, means responsive to the receipt of a control signal for selectively connecting said charged capacitor to said trunk as part of a voltage multiplier arrangement, and means responsive to the receipt of another control signal for selectively connecting said charged capacitor to said trunk to neutralize an electrical capacitance charge of said trunk.

2. Communication trunk circuitry comprising a communication trunk, an impedance termination network including a capacitor and a resistance, means for selectively connecting said network to said trunk, a source for supplying electrical potentials to said trunk, means for charging said capacitor to the supplied electrical potentials of said source, and means responsive to the receipt of a control signal for selectively connecting said charged capacitor in series with said electrical potentials of said source whereby twice said source electrical potentials are supplied to said trunk.

3. Communication trunk circuitry in accordance with claim 2 wherein said trunk comprises a pair of conductors having an electrical capacitance, and further comprising means for electrically charging said trunk conductor capacitance to said source electrical potentials, and means responsive to another control signal for selectively connecting said charged network capacitor to said trunk in opposition to the electrical charge of said conductor capacitance and thereby neutralizing said last-mentioned charge.

4. Seizure control equipment comprising a two-conductor communication line, a first source of potential connected to a first terminus of one of the line conductors, a second source of potential, an electrical apparatus having a multi-terminal energizing device, one terminal thereof being connected to said second source of potential and another terminal thereof being connected to a first terminus of the other one of said line conductors, a capacitance, means for electrically charging said capacitance, and means responsive to a control signal for connecting said charged capacitance to a second terminus of each of said line conductors in a cooperating relationship with said first and second potentials to energize said apparatus.

5. Seizure control equipment in accordance with claim 4 wherein said electrical apparatus comprises an electromechanical relay having a pair of windings, one of said pair of windings being serially connected between said first source of potential and said first terminus of said one line conductor, and the other one of said pair of windings being serially connected between said second source of potential and said first terminus of said other one of said line conductors.

6. Seizure control equipment in accordance with claim 4 wherein said charged capacitance is serially connected between said second termini of said line conductors, and further comprising means including a unidirectional current device connectable in parallel with said charged capacitance to provide a high electrical resistance between said line conductors while said capacitance is charged and a relatively low electrical resistance between said line conductors when said capacitance has been discharged.

7. In a communication system, a two-way trunk having a pair of conductors; a pair of two-way trunk circuits, each being individually connected to one end of said trunk conductors and comprising a source supplying a plurality of potentials, a relay having a pair of two-terminal windings, one terminal of each of said windings being connected to an individual one of said potentials, the other terminal of each of said windings being individually connected to one end of one of said trunk conductors, and circuitry selectively connectable to the last-mentioned ends of said trunk conductors for effecting the operation of the relay connected to the other end of said trunk conductors; and means in said circuitry of one of said trunk circuits including a capacitor, means for charging said capacitor, and means for connecting the charged capacitor to the associated ends of said trunk conductors for cooperating with said supplied potentials to operate said relay at the other ends of said trunk conductors.

8. In a telephone system having a two-conductor trunk and means for electrically charging the capacitance of said trunk conductors during a telephone call, a trunk circuit associated with one end of said trunk for serving telephone calls and comprising apparatus operable in response to the receipt of an incoming call over said trunk for controlling the establishment of call connections, said apparatus being also operable under control of the electrical charge on the trunk conductors after the termination of said call, a source for supplying electrical potentials, a capacitor, means for charging said capacitor to the supplied potentials, and means responsive to the termination of said call for connecting the charged capacitor to said trunk conductors to cancel said electrical charge of said trunk conductors.

9. In a telephone system, a two-way trunk having a pair of conductors, a first trunk circuit associated with one end of said trunk for serving calls in each direction over said trunk and comprising incoming call detecting apparatus including a pair of electrical potentials, a relay having a pair of windings, each of said pair of windings being serially connectable between one of said pair of conductors and one of said pair of potentials, a capactor, a resistance, means for selectively connecting said capacitor in series with said resistance to each of said conductors so that said capacitor is charged to said potentials, a unidirectional current device, control means responsive to an outgoing call from said trunk circuit over said trunk for disconnecting said relay from said trunk and connecting said charged capacitor to said conductors in parallel with said device, a second trunk circuit associated with another end of said trunk for serving calls in each direction over said trunk and comprising incoming call detecting apparatus including another pair of electrical potentials, another relay having a pair of windings, each of said pair of windings being serially connectable between one of said pair of conductors and one of said other pair of potentials, said other relay being operated in response to the connection of said charged capacitor to said trunk conductors and subsequently held operated via said unidirectional current device and said resistance connected in parallel with said capacitor, and means controlled by said other relay for reversing the connections between said other potentials and said pair of trunk conductors during each call and for a predetermined time period thereafter, said first trunk circuit further comprising a polarized relay, and means responsive to the termination of said outgoing call for connecting said polarized relay to said trunk conductors to detect when said connections between said other potentials and said trunk conductors are again reversed at the end of said time period.

10. In a telephone system according to claim 9, the combination wherein said trunk conductors have an electrical capacitance and said capacitance is charged to said other potentials supplied to said trunk conductors during an incoming call to said first trunk circuit, and wherein said first trunk circuit further comprises means responsive to the termination of said incoming call for connecting said charged capacitor to said trunk conductors to cancel the electrical charge of said conductor capacitance.

11. A two-way telephone trunk circuit comprising a first communication path connectable to a two-way trunk for serving incoming and outgoing telephone calls, a second communication path connectable to a telephone switching network for establishing incoming call connections, a supervisory device, means responsive to the receipt of an incoming call for selectively connecting said device to said second path for supervising incoming call connections through said network, and means responsive to the receipt of an outgoing call for selectively connecting said device to said first path for detecting when a trunk circuit at a distant end of said trunk has restored to its idle state after the termination of said outgoing call.

12. A two-way telephone trunk circuit in accordance with claim 11 wherein said supervisory device comprises a polarized relay.

No references cited.

WILLIAM C. COOPER, *Primary Examiner.*